United States Patent
Ding et al.

(10) Patent No.: US 7,427,755 B2
(45) Date of Patent: Sep. 23, 2008

(54) INTEGRATED ELECTRON BEAM TIP AND SAMPLE HEATING DEVICE FOR A SCANNING TUNNELING MICROSCOPE

(75) Inventors: Haifeng Ding, Nanjing (CN); Dongqi Li, Beijing (CN); John E. Pearson, Plainfield, IL (US)

(73) Assignee: UChicago Argonne, LLC, Chicago, IL (US)

(*) Notice: Subject to any disclaimer, the term of this patent is extended or adjusted under 35 U.S.C. 154(b) by 238 days.

(21) Appl. No.: 11/443,714

(22) Filed: May 31, 2006

(65) Prior Publication Data

US 2007/0029480 A1 Feb. 8, 2007

Related U.S. Application Data

(60) Provisional application No. 60/705,123, filed on Aug. 3, 2005.

(51) Int. Cl.
*G01N 23/00* (2006.01)

(52) U.S. Cl. ............... 250/306; 250/440.11; 250/443.1; 250/307

(58) Field of Classification Search ................ 250/310, 250/440.11, 443.1, 306, 307; 977/861, 860, 977/849, 840, 900, 901
See application file for complete search history.

(56) References Cited

U.S. PATENT DOCUMENTS

| | | | | |
|---|---|---|---|---|
| 3,770,934 | A * | 11/1973 | Randmer ............... 219/121.12 |
| 4,939,363 | A * | 7/1990 | Bando et al. .............. 250/306 |
| 5,061,850 | A * | 10/1991 | Kelly et al. ............... 250/306 |
| 5,099,117 | A * | 3/1992 | Frohn et al. .............. 250/306 |
| 5,278,406 | A * | 1/1994 | Kinoshita ................. 250/306 |
| 5,440,122 | A * | 8/1995 | Yasutake ............... 250/443.1 |
| 5,504,366 | A * | 4/1996 | Weiss et al. ................ 73/863 |
| 5,619,035 | A * | 4/1997 | Weiss et al. .............. 250/306 |
| 5,652,428 | A * | 7/1997 | Nishioka et al. .......... 250/307 |
| 5,731,587 | A * | 3/1998 | DiBattista et al. ....... 250/443.1 |
| 5,821,545 | A * | 10/1998 | Lindsay et al. ......... 250/443.1 |
| 2004/0238739 | A1* | 12/2004 | Gross ...................... 250/310 |
| 2006/0275958 | A1* | 12/2006 | Ruess et al. .............. 438/149 |

OTHER PUBLICATIONS

Scholz, et al "Low thermal power electron beam annealing of scanning tunneling microscope tips" Rev. Sci. Instrum. 68 (8) Aug. 1997.*

Devlin, et al "A unique facility for surface microscopy" Materials Science and Engineering B 96 (2002) 215-220.*

Wiessner, et al "Design considerations and performance of a combined scanning tunneling and scanning electron microscope" Rev. Sci. Instrum. 68 (10) Oct. 1997.*

* cited by examiner

*Primary Examiner*—Jack I. Berman
*Assistant Examiner*—Michael Maskell
(74) *Attorney, Agent, or Firm*—Joan Pennington (57) ABSTRACT

An electron beam heating device with the temperature up to 2200 K is provided for heating a sample and a tip for a scanning tunneling microscope (STM). The electron beam heating device includes a base stage for mating respectively with an electron beam sample heating carrier and an electron beam tip heating carrier, both carriers include a filament. The integration of the filament into the transferable electron beam sample heating carrier and electron beam tip heating carrier enables filament exchange without venting the vacuum system. A fixed distance between the sample and the filament enables reproducible sample temperature control and the filament is mounted at a back of the sample, allowing optical access for temperature measurement, and allowing sample preparation processes without changing positions of the sample or the filament. Once the tip is loaded, a fixed relative position between the tip and the filament enables reproducible control of heating. A tip holder includes an electrically isolated post connected to the tip, enabling a separate electrical potential to be applied to the tip.

17 Claims, 10 Drawing Sheets

Topography

Magnetic image

FIG. 7B

INTEGRATED ELECTRON BEAM TIP AND SAMPLE HEATING DEVICE FOR A SCANNING TUNNELING MICROSCOPE

This application claims the benefit of U.S. Provisional Application No. 60/705,123, filed on Aug. 3, 2005.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to scanning tunneling microscopes, and more particularly to an electron beam tip and sample heating device for a scanning tunneling microscope (STM), such as an Omicron variable temperature scanning tunneling microscope (STM).

DESCRIPTION OF THE RELATED ART

Scanning tunneling microscopy (STM) is an important tool for surface science characterization. STM has developed into a powerful surface analysis technique because it can provide three dimensional, real-space images of the surfaces at high spatial resolution. Providing a clean and flat sample and a sharp STM tip, atomic resolution can be achieved.

By varying the tip-sample bias, STM can also probe the local electronic structures of the surface. This is often called scanning tunneling spectroscopy (STS).

Scanning tunneling microscopes (STMs) can work in many different conditions, from ambient atmosphere to Ultra-high vacuum (UHV). UHV-STM is of particular interest for basic science research as the sample can be prepared and investigated in an environmentally clean manner. Recently, STM has also been successfully demonstrated to probe the magnetization orientation of the sample surface via tip magnetization modulation and/or spin polarized STS techniques.

STM tips are typically made from W (tungsten), Au (gold), or PtIr (platinum iridium) wires. Among them, W tips are most commonly used. STM W tips are usually prepared outside the UHV chamber with an electro-chemical etching method. The W tips are covered by a thin native oxide layer before being introduced into the microscope. The oxide layer needs to be removed in order to obtain stable tunneling conditions. Recently development of spin-polarized STS technique can provide magnetic imaging with high resolution, but requires heating the tip above 2200 K to remove the oxide layer.

Omicron Nanotechnology, one of the manufacturers for a scanning tunneling microscope (STM), currently provides three techniques for heating the sample. One of these techniques is direct heating, by passing a current through the sample. The direct heating technique requires the sample to have a certain minimum resistance (2 Ω). The direct heating technique can only reach a maximum temperature of 1500 K. Another of these techniques is radiation heating by a pyrolytic boron nitride (PBN) heating element, which is located behind the sample. However, this radiation heating method can only reach a temperature of 750 K. A third technique is electron beam heating, which can be applied to a low resistance sample and can reach high temperature. The electron beam heating design, while able to heat both the tip and the sample to high temperatures, places the filament in front of the sample surface where it blocks the optical access of a pyrometer for temperature measurement. Temperature measurement, however, is very important to annealing, since insufficient heating results in a rough surface and overheating can kill the sample. Further, the design requires tedious alignment between the filament and sample, which makes it difficult to achieve reproducible heating conditions.

Principal aspects of the present invention are to provide an electron beam tip and sample heating device for a scanning tunneling microscope (STM), such as, an Omicron variable temperature scanning tunneling microscope (STM).

Other important aspects of the present invention are to provide such electron beam tip and sample heating device substantially without negative effect and that overcome some of the disadvantages of prior art arrangements.

Other important aspects of the present invention are to provide such electron beam tip and sample-heating device that utilizes a single electron beam heating stage that allows for heating of both the sample and the tip higher than 2300 K.

SUMMARY OF THE INVENTION

In brief, an electron beam heating device is provided for heating a sample and a tip for a scanning tunneling microscope (STM). The electron beam heating device includes an electron beam sample heating carrier and an electron beam tip heating carrier. Both the electron beam sample heating carrier and the electron beam tip heating carrier include a filament. The filament of both the electron beam sample heating carrier and the electron beam tip heating carrier is respectively mounted between a pair of contact bars that are electrically isolated from the sample carrier and the tip carrier. A base stage is arranged for mating engagement with the electron beam sample heating carrier and the electron beam tip heating carrier. The base stage couples electrical current and high voltage to the electron beam sample heating carrier and the electron beam tip heating carrier.

In accordance with features of the invention, the filament of the electron beam sample heating carrier is mounted at a back of the sample, allowing optical access for temperature measurement, and allowing sample preparation processes without changing positions of the sample or the filament. A fixed distance is provided between the sample and the filament, enabling reproducible sample temperature control.

In accordance with features of the invention, two filaments or a double wire filament surrounds the tip on electron beam tip heating carrier. A relative position between the tip and the filaments is fixed once the tip is loaded, enabling reproducible tip temperature control. A tip holder includes an electrically isolated post connected to the tip, enabling a separate electrical potential to be applied to the tip.

In accordance with features of the invention, the electron beam heating device can be mounted on a linear bellows with electrical feed-throughs, and can be easily installed into the transfer path of a vacuum load-lock without further modification of the main sample preparation chamber. The electron beam heating device can be used for heating of the sample and the STM tip higher than 2300 K.

In accordance with features of the invention, the filaments are integrated into the transferable electron beam sample heating carrier and electron beam tip carrier, enabling replacement of filaments without venting the vacuum system.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the preferred embodiments, an electron beam tip and sample heating device is provided for a scanning tunneling microscope (STM), such as, an Omicron variable temperature scanning tunneling microscope (STM). The electron beam tip and sample heating device includes a single electron beam heating base stage which is arranged for mating with an electron beam sample heating carrier of the preferred embodiment and the electron beam tip heating carrier of the preferred embodiment. The electron beam sample heating carrier and an electron beam tip heating carrier are enhanced arrangements used instead of conventional sample and tip carriers provided by Omicron Nanotechnology.

Figure 1:
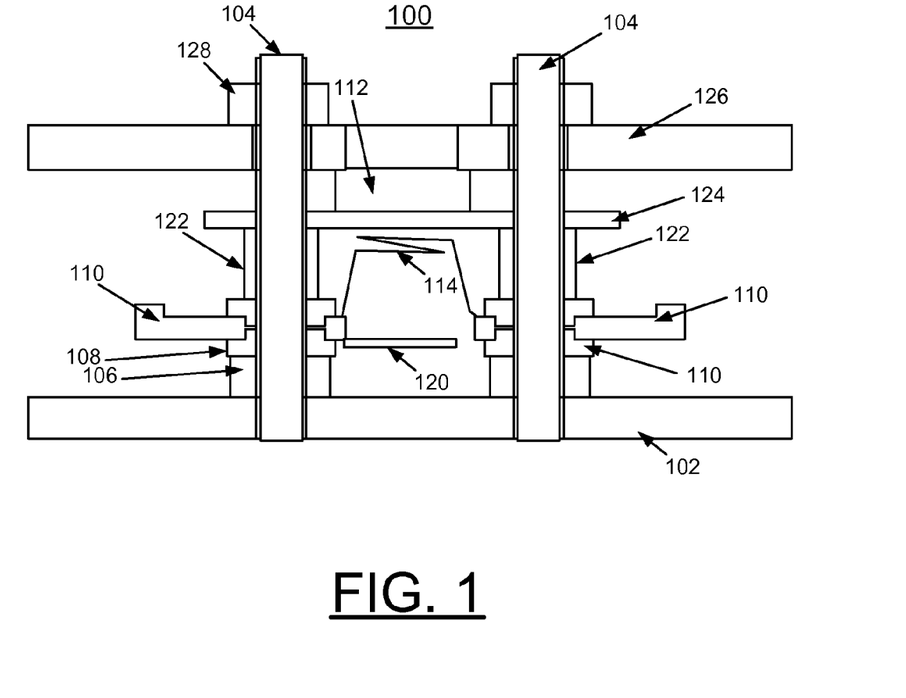
FIG. 1 is a side view illustrating an exemplary electron beam sample heating carrier in accordance with the preferred embodiment.

Having reference now to the drawings, in FIG. 1 there is shown an exemplary electron beam heating sample carrier generally designated by the reference character 100 in accordance with the preferred embodiment. The electron beam heating sample carrier 100 includes a bottom plate 102, such as a molybdenum (Mo) bottom carrier plate. A plurality (four) of threaded rods 104 are fixed to the bottom plate 102 with a respective nut 106, such as 4 Mo nuts.

A respective ceramic bushing 108 on top of each of the bottom Mo nuts 106 is used to fix a pair of contact bars 110 with electrical isolation from a sample 112 and other parts of the sample carrier 100. An S-shape filament 114 is mounted between the two contact bars 110.

In addition, a U-shape electron reflector 120 is connected to one of the contact bars 110 to reflect the electrons from heating the molybdenum (Mo) bottom carrier plate 102. On top of the ceramic bushings 108, a corresponding one of a plurality of threaded spacers 122 is used for fixing the ceramic bushings 108 and support the sample 112 in the desired position. The sample 112, typically 4×6×1 mm$^3$, is clamped between a sample support spring 124 and a top ceramic plate 126 which is fixed with the top Mo nuts 128.

In the electron beam heating sample carrier 100, the sample 112 is electrically connected to the Mo bottom plate 102. Molybdenum advantageously is used to from for the bottom plate 102 and nuts 106,128 due to its high temperature, oxidation resistant, and machining properties.

Importantly, none of the contact bars 110 are electrically connected the bolts 104 or nuts 106. This allows building a potential difference between a sample 112 and the filament 114 required for electron beam heating.

During STM measurements, a cooling block clamp (not shown) is used to ground the Mo bottom plate 102, and the electrically connected sample 112 is grounded, enabling the STM measurements. The electron beam heating sample carrier 100 requires parallel mounting between the ceramic plate 126 and the Mo bottom plate 102.

As the filament 114 is mounted at the back of the sample 112, the electron beam heating sample carrier 100 allows easy optical access for optical temperature measurement; and simultaneous sputtering and annealing. In addition, the filament 114 is integral to the sample carrier with a fixed distance between the sample 112 and filament 114. This enables reproducible control of the sample temperature and easy replacement of the filament 114 without breaking vacuum.

The electron beam heating sample carrier 100 in accordance with the preferred embodiment has been successfully used to clean and anneal a Ru(0001) crystal and an Fe(001) whisker.

Figure 2:
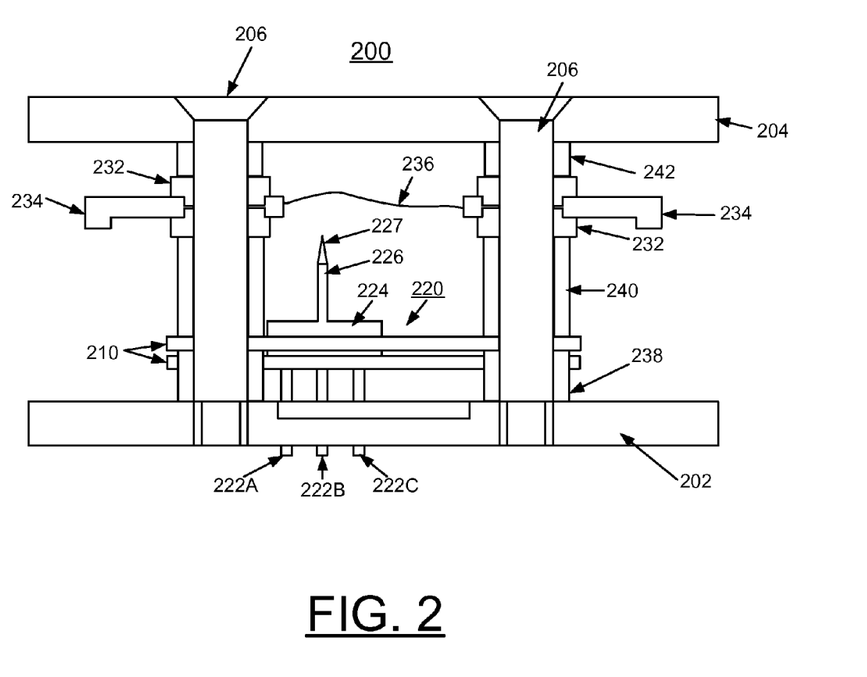
FIG. 2 is a side view illustrating an exemplary electron beam tip heating carrier in accordance with the preferred embodiment.

Referring now to FIG. 2, there is shown an exemplary electron beam tip heating carrier generally designated by the reference character 200 in accordance with the preferred embodiment. The electron beam tip heating carrier 200 includes a bottom plate 202 and a top plate 204 that are fixed together with a plurality (four) of bolts 206. The bottom plate 202 also is illustrated and described with respect to FIGS. 3A, and 3B.

Figure 3A:
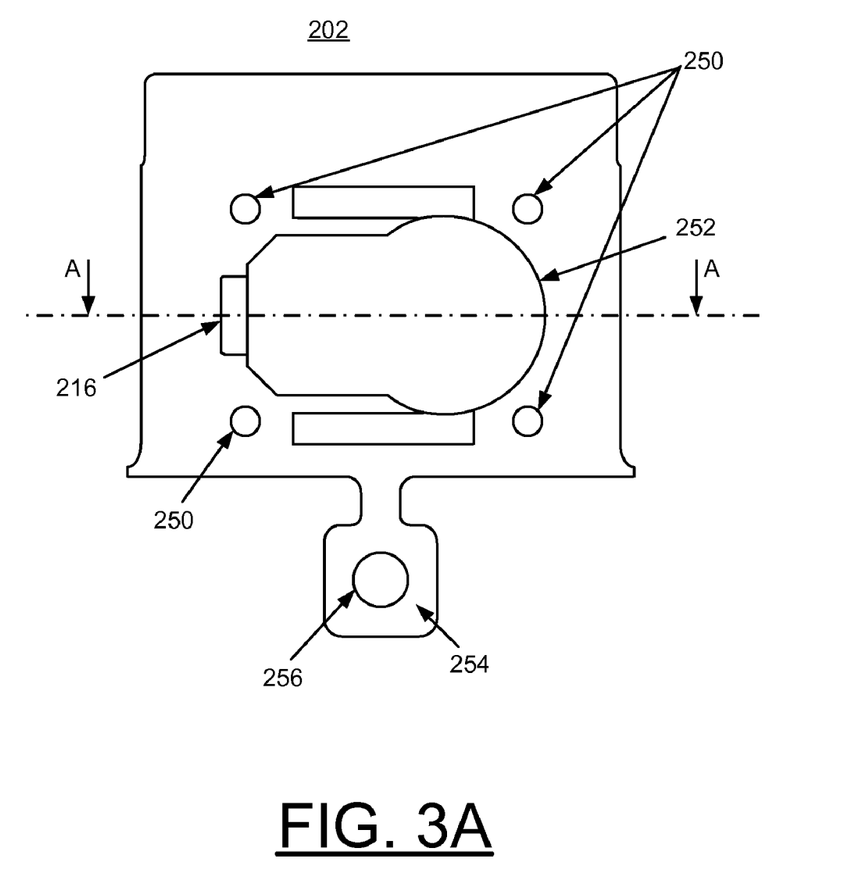
FIG. 3A is a plan view illustrating a bottom plate of the exemplary electron beam tip heating carrier of FIG. 2 in accordance with the preferred embodiment.

A pair of orientation locks or horizontal bars 210 and a magnet indicated by reference character 216 in FIG. 3A are used to orientate a STM tip holder generally designated by the reference character 220. The STM tip holder 220 includes a plurality (three) of vertically extending posts 222A, 222B, 222C and a horizontally extending member 224.

The central post 222B is connected with a STM tip 226 and is thus in the same position relative to the orientation locks 210 and tip carrier 200. A tip end 227 of the SMT tip 226 is positioned above the orientation locks 210. This allows the positioning of a spring contact 518 for this post 222B on a base stage 500 at a different potential from the rest of the tip holder 220 and carrier 200. The base stage 500 is illustrated and described with respect to FIGS. 5A, 5B, and 5C.

A plurality (four) of ceramic bushings 232 are used to electrically isolate a pair of contact bars 234 from the rest of the tip carrier 200. The two contact bars 234 are illustrated and described with respect to FIGS. 4A, and 4B. A double wire filament 236 is used between the two contact bars 234 to provide thermo-emitted electrons for tip heating. The double wire filament 236 surrounds the tip 226. A plurality of respective spacers 238, 240, 242 are provided on bolts 206 respectively between the base plate 202 and the orientation locks 210, between the orientation locks 210 and the ceramic bushing 232, and between the ceramic busing 232 and the top plate 204.

In the electron beam tip heating carrier 200, the relative position between the tip 226 and the filament 236 is fixed once the tip is loaded. Therefore, reproducible conditions are achieved. The filament 236 is integrated into the electron beam tip heating carrier 200, enabling easy replacement of the filament without breaking the vacuum. The electron beam tip heating carrier 200 has been successfully used to clean W tips and obtained magnetic imaging on MnFe(001) system with an Fe coated tip.

Figure 3B:
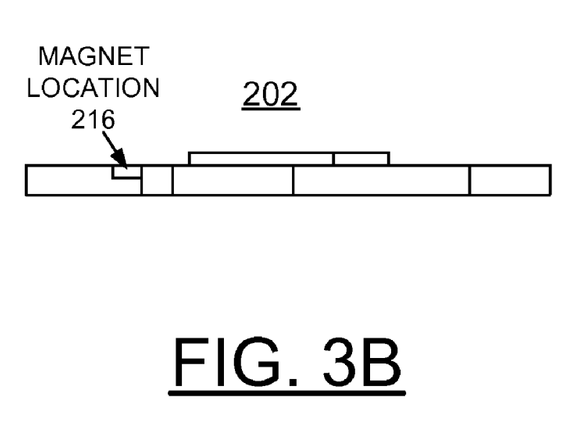
FIG. 3B is a side view of the bottom plate taken along the line A-A in FIG. 3A in accordance with the preferred embodiment.

FIGS. 3A and 3B are respective plan and side views of the bottom plate 202 of the exemplary electron beam tip heating carrier 200 in accordance with the preferred embodiment. The bottom plate 202 conforms in shape and dimensions to a conventional base plate of a conventional tip carrier manufactured by Omicron Nanotechnology. The bottom plate 202 includes a plurality of openings 250 for receiving the bolts 206 and a predetermined shaped opening 252 for receiving the STM tip holder 222. An outwardly extending tab 254 with a central opening 256 is provided for engagement with a gripper or a wobble-stick (not shown).

Figure 4A:
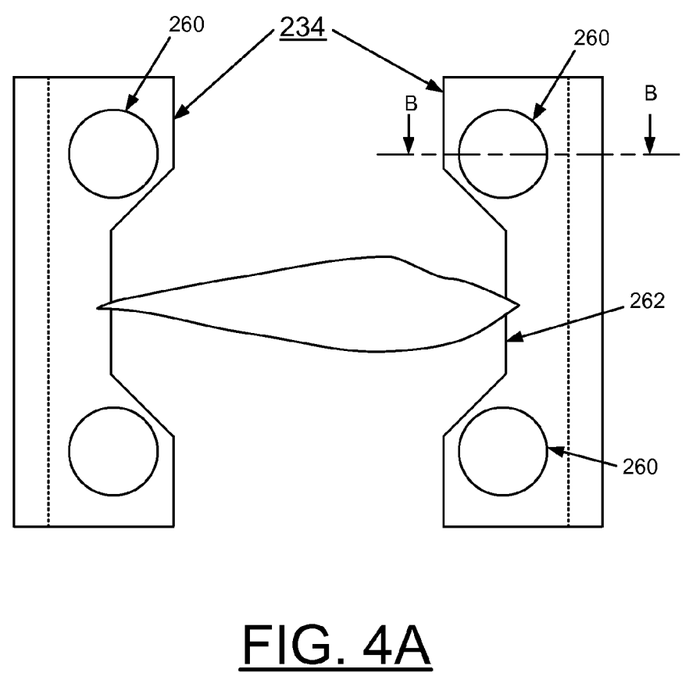
FIG. 4A is a plan view illustrating a contact bar of the exemplary electron beam tip heating design of FIG. 2 in accordance with the preferred embodiment.
Figure 4B:
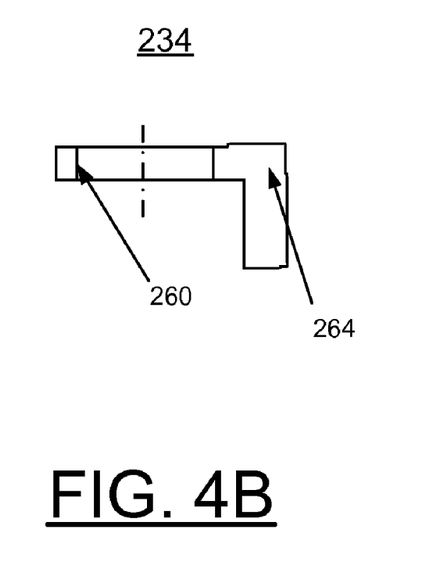
FIG. 4B is a side view of the contact bar taken along the line B-B in FIG. 4A in accordance with the preferred embodiment.

FIGS. 4A and 4B are respective plan and side views of the contact bars 234 of the exemplary electron beam tip heating carrier 200 in accordance with the preferred embodiment. Each contact bar 234 includes a pair of openings 260 for receiving the bolts 206 and a tapered recessed portion 262 generally centrally disposed between the openings 260. Each contact bar 234 includes an outside flange or ledge portion 264, as shown in FIG. 4B.

Figure 5A:
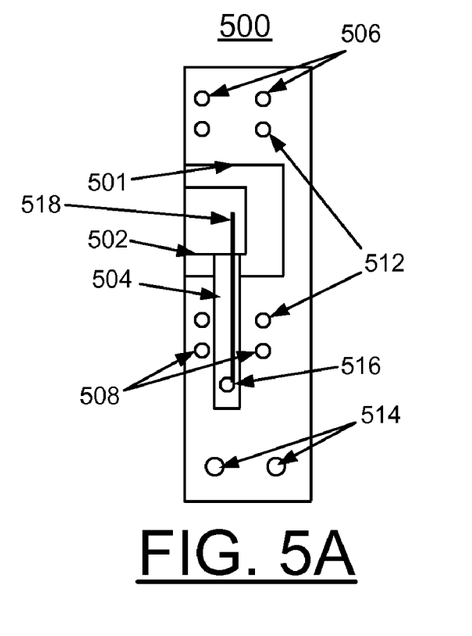
FIG. 5A is a front view illustrating an exemplary base stage design receiving the electron beam sample heating carrier of FIG. 1 and the electron beam tip heating carrier of FIG. 2 in accordance with the preferred embodiment.
Figure 5B:
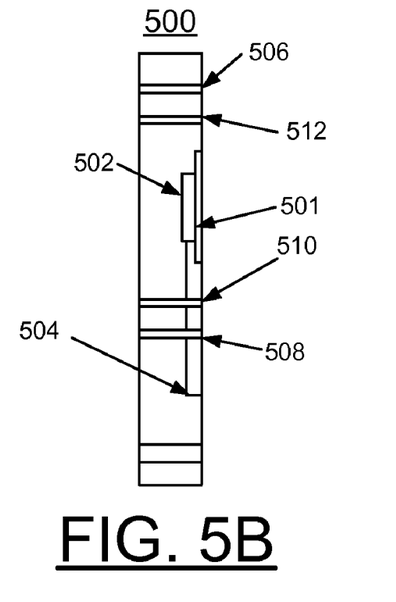
FIG. 5B is a side view illustrating the exemplary base stage design of FIG. 5A in accordance with the preferred embodiment.
Figure 5C:
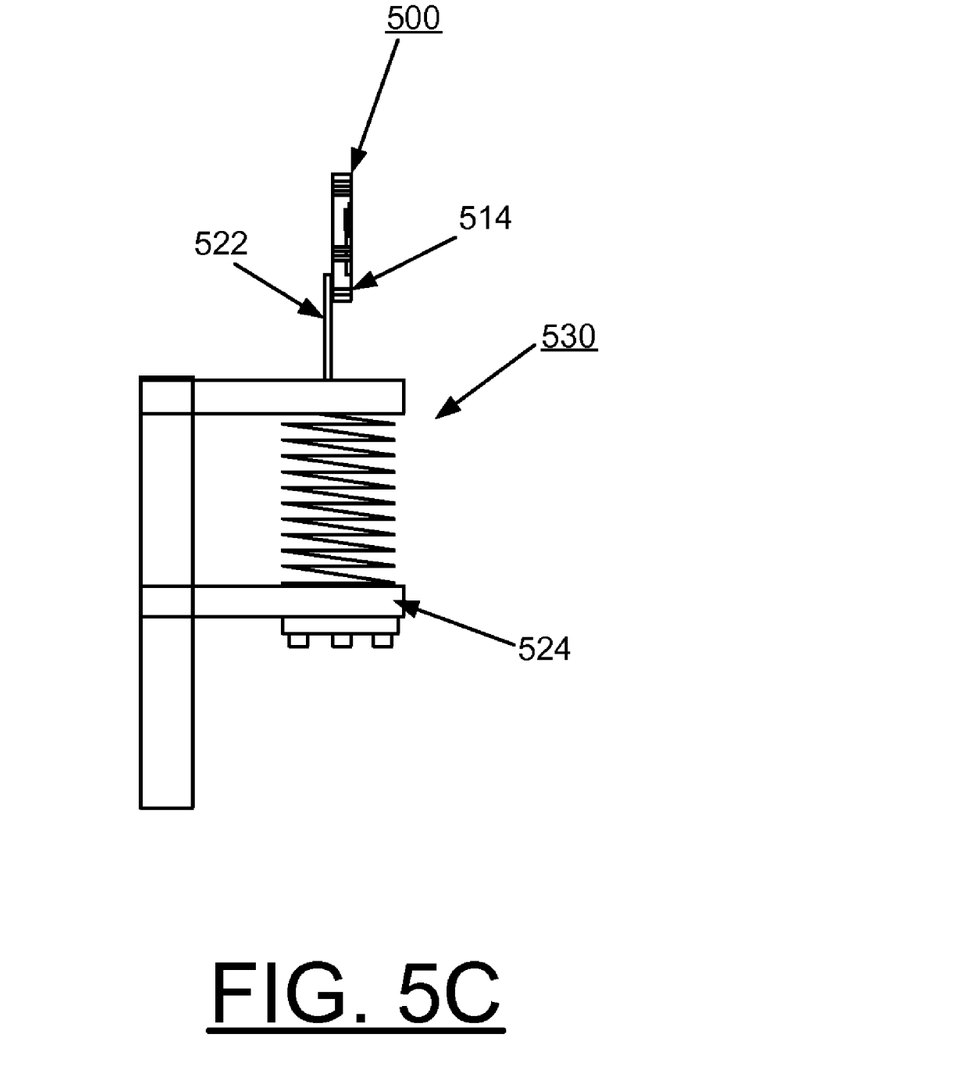
FIG. 5C illustrates the exemplary base stage design of FIG. 5A mounted on a linear motion bellows with electrical feedthroughs in accordance with the preferred embodiment.

Referring to FIGS. 5A, 5B, and 5C there is shown an exemplary base stage generally designated by the reference character 500 in accordance with the preferred embodiment. The base stage 500 is arranged for receiving and for coupling electrical current and high voltage to the electron beam sample heating carrier 100 and the electron beam tip heating carrier 200 in accordance with the preferred embodiment.

The base stage 500 is made of a UHV compatible and machinable insulating ceramic, named Macor (by Corning Inc). The base stage 500 is a rectangular bar of Macor with a plurality of (three) slots 501, 502, 504, and a plurality of sets of thru-holes 506, 508, 510, 514. A first large square slot 501 mates with the bottom plate of the sample or tip carrier 100 or 200, another smaller square slot 502 provides clearance of the three posts 222A, 222B, 222C of the tip holder 220, and one long slot 504 holds a W wire spring 518 for HV contacting to the back plate of the sample carrier 200 or the post 222B connected to the tip 226 on the tip holder 220.

The two outer pairs of small holes 506, 508 are contact brush mounting openings used to mount the contact brushes (not shown) and each of the contact brushes are electrically connected to the electrical feed thru where the filament current is applied. The two inner pairs of small holes 510, 512 are clamp mounting openings used to mount clamps for securing the bottom plate 102, 202 of the sample carrier 100 and the tip carrier 200.

When the sample and tip carriers 100, 200 are inserted into the base stage 500, the bottom plate 102, 202 is fixed by the clamps and the contact bars 110, 234 in the carriers 100, 200 are engaged with the respective contact brushes. In such assembled condition, the current can pass through the filament 114, 236 and thermo-emitted electrons can be generated. The single small hole 516 is used to mount a W spring wire contact 518 in slot 504.

When the tip carrier 200 is inserted to the stage 500, only the post 222B of the tip holder 220 that is connected with the tip 226 can touch the W spring 518 where the high voltage is applied. Therefore, electrons can be focused onto the tip end 227 to flash the tip 226.

When the sample carrier 100 is inserted to the stage 500, the base plate 102 can touch the W spring 518 where the high voltage is applied. Therefore, electrons can be focused onto the back of the sample 104 to heat the sample.

As shown in FIG. 5C, the bottom two big holes 514 are used to mount the stage 500 to an elongated plate 522 and a 2.75 inch flange 524 with the electrical feedthroughs. The flange 524 is mounted on a linear motion bellows 530, for example, as shown in FIG. 5C. The whole setup is mounted to a flange perpendicular to the transfer path of a vacuum load-lock (not shown) without further modification of the main sample preparation chamber (not shown)

Figure 6A:
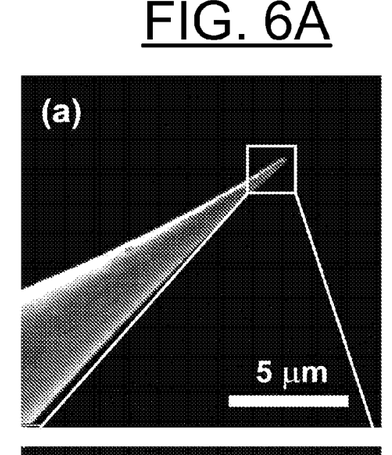
FIGS. 6A, 6B, 6C, and 6D are SEM images illustrating the exemplary tip before and after flash cleaning.
Figure 6B:
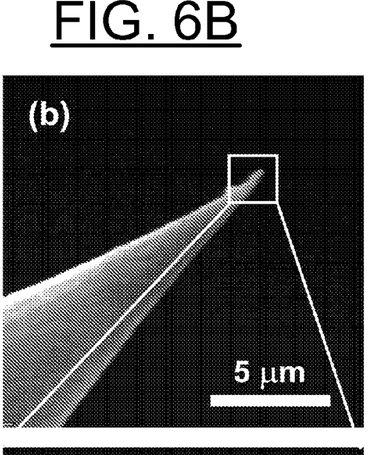
Figure 6C:
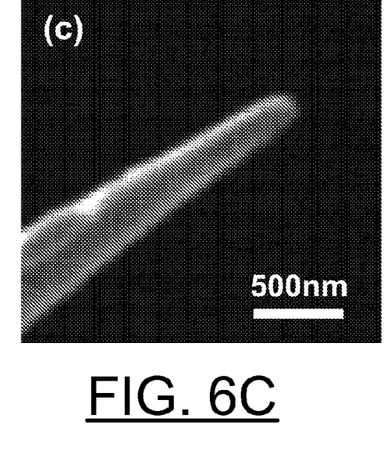
Figure 6D:
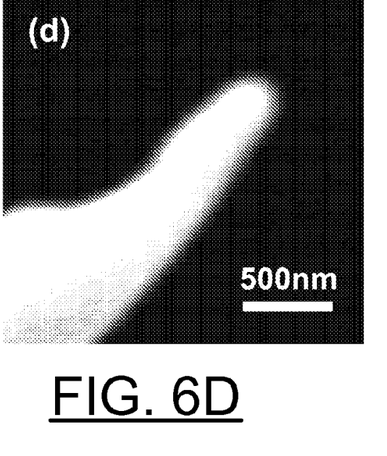

Referring to FIGS. 6A, 6B, 6C, and 6D, there are shown SEM images illustrating the exemplary tip before and after flash cleaning. Scanning electron microscopy images of a fresh prepared tip are shown in FIGS. 6A, 6C before flash cleaning and of the tip after flash cleaning are shown in FIGS. 6B, and 6D.

FIG. 6A and its magnified view in FIG. 6C presents the fresh tip imaged with scanning electron microscopy (SEM). The tip 226 is prepared using electro chemical etching with 5% NaOH acid. After etching, the tip 226 is rinsed with de-ionized water for 10 min before introducing into the SEM for imaging with 10 kV electrons. The images of FIGS. 6A, 6C show a pointed tip 226 with a diameter of about 50 nm. After SEM imaging, the tip 226 was transferred into the UHV system via a load-lock system and flashed using the electron beam heating tip carrier 200. FIGS. 6B, and 6D presents the same tip 226 shown in FIGS. 6A, 6C after flashing. Macroscopically, there is no significant change in tip shape. At higher magnification in FIG. 6D, one can see that the tip 226 becomes blunt after flashing. The estimated diameter of the tip end 227 is about 300 nm suggesting that parts of the tip end were melted.

We choose Mn/Fe(001) system to demonstrate the magnetic imaging capability as the system has shown layer by layer antiferromagnetism with both spin polarized (SP)-STM and SP-STS. The experiments are performed in a UHV chamber with the base pressure of $4 \times 10^{-11}$ mBar. The system is equipped with an Omicron variable temperature STM, low energy electron diffraction, Auger electron spectroscopy and a Magneto-optical Kerr effect apparatus. After flash cleaning the tip 226, the tip is coated with 6-10 ML Fe at room temperature. In-plane magnetization is expected with this thickness range of coating.

Before being introduced into the STM, the coated tip is further annealed at about 670 K for 1 min and cooled down to room temperature in a magnetic field of 1700 Oe and in the direction of the Fe whisker long axis. The Fe whisker with the dimension of $4 \times 1 \times 0.5$ mm$^3$ is initially annealed in H$_2$ with the pressure of $5 \times 10^{-4}$ mBar for 5-7 days to deplete the C, O, S and N impurity as described previously. After pumping the H$_2$ away from the system, the Fe whisker is subsequently hot sputtered with Ar$^+$ ions at ~870 K. The ion energy of 800 V and the angle of incidence of 60° are used for the sputtering. After sputtering, the whisker is further annealed at ~1020 K for 3 min far below the bcc-fcc phase transition temperature of 1220 K. Mn with the purity of 99.99% is deposited by electron beam evaporator at the substrate temperature of ~370 K. After the deposition, the sample is transferred into the STM chamber for the measurement. STM and STS are performed at room temperature. A lock-in technique with typical modulation frequency of 9.2 kHz and amplitude of 30-50 mV is used for the STS measurements.

We find that Mn grows in a Stranski-Krastanov mode on Fe(001) at 370 K, in good agreement with previous findings. The first 3 monolayer (ML) Mn grows in a layer-by-layer fashion. Above 3 ML, 3 dimensional growth appears, resulting in Mn layers with several different heights.

Figure 7A:
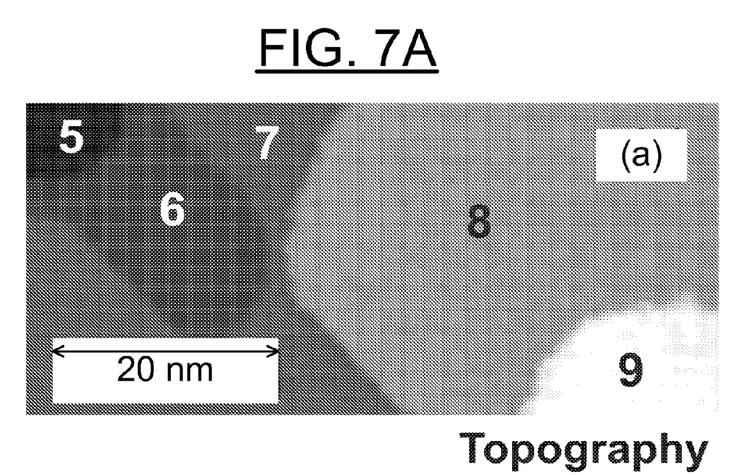
FIG. 7A illustrates an exemplary topographic image.

FIG. 7A presents an exemplary topographic image of ~7.4 ML equivalents of Mn on Fe(001) that was obtained with bias voltage of −0.4 V and feedback setting of 1 nA. In this image, we can see 5 different layers of Mn are exposed. The different Mn layers are indicated by the corresponding thickness in ML.

Figure 7B:
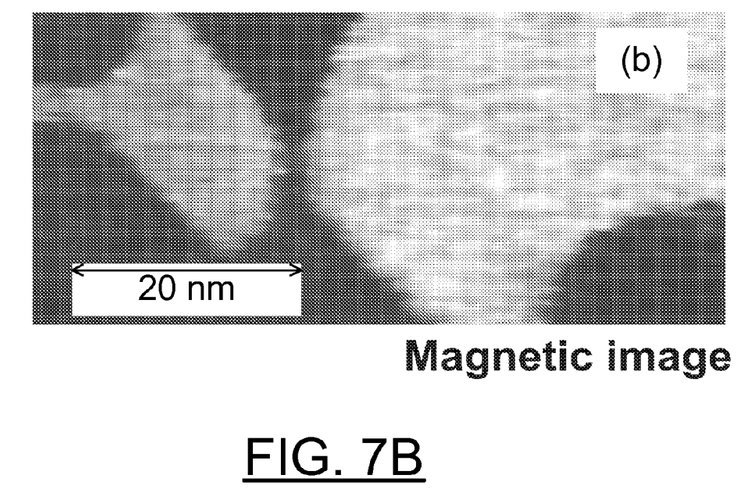
FIG. 7B illustrates a spectroscopy or magnetic image for the exemplary topographic image of FIG. 7A obtained by the use of the exemplary base stage design of FIG. 5A receiving the electron beam sample heating carrier of FIG. 1 and the electron beam tip heating carrier of FIG. 2 in accordance with the preferred embodiment.

FIG. 7B shows the spectroscopy (magnetic) image simultaneously obtained with topographic image shown in FIG. 7A. It shows alternating dark and bright contrast corresponding to the odd/even Mn layer. The contrast changes its sign at +0.25 V. We note that no contrast is observed when the W tips without Fe coating are used. This evidences that Mn on Fe(001) has the layer-by-layer antiferromagnetism in good agreement with previous findings.

While the present invention has been described with reference to the details of the embodiments of the invention shown in the drawing, these details are not intended to limit the scope of the invention as claimed in the appended claims.

What is claimed is:

1. An electron beam heating device for a scanning tunneling microscope (STM), said electron beam heating device used for heating of a sample and a STM tip, said electron beam heating device comprising:
   an electron beam sample heating carrier;
   an electron beam tip heating carrier;
   said electron beam sample heating carrier and said electron beam tip heating carrier include a filament;
   each said filament of said electron beam sample heating carrier and said electron beam tip heating carrier being mounted between a pair of contact bars; and contact bars being electrically isolated from said sample carrier and said tip carrier; and
   a base stage for mating engagement with one of said electron beam sample heating carrier and said electron beam tip heating carrier; said base stage for coupling electrical current and high voltage to said electron beam sample heating carrier and said electron beam tip heating carrier; and
   said electron beam tip heating carrier includes a tip holder, said tip holder includes an electrically isolated post connected to the tip, enabling a separate electrical potential to be applied to the tip.

2. An electron beam heating device as recited in claim 1 wherein said filament of said electron beam sample heating carrier is mounted at a back of the sample, allowing optical access for temperature measurement, and allowing sample preparation processes without changing positions of the sample or the filament.

3. An electron beam heating device as recited in claim 1 wherein a fixed distance is provided between the sample and said filament of said electron beam sample heating carrier, enabling reproducible sample temperature control.

4. An electron beam heating device as recited in claim 1 wherein said filament of said electron beam tip heating carrier and the tip are provided in a fixed relative position when the tip is loaded, enabling reproducible tip temperature control.

5. An electron beam heating device as recited in claim 1 wherein said filament is integrated into said electron beam sample heating carrier and said electron beam tip heating carrier and said electron beam sample heating carrier and said electron beam tip heating carrier are transferable, enabling easy replacement of the said filament without breaking the vacuum system.

6. An electron beam heating device as recited in claim 1 wherein said base stage is mounted on a linear bellows with electrical feed-throughs for installing the electron beam heating device into the transfer path of a vacuum load-lock.

7. An electron beam heating device for a scanning tunneling microscope (STM), said electron beam heating device used for heating of a sample and a STM tip, said electron beam heating device comprising:
   an electron beam sample heating carrier;
   an electron beam tip heating carrier;
   said electron beam sample heating carrier and said electron beam tip heating carrier include a filament;
   each said filament of said electron beam sample heating carrier and said electron beam tip heating carrier being mounted between a pair of contact bars; and contact bars being electrically isolated from said sample carrier and said tip carrier; and
   a base stage for mating engagement with one of said electron beam sample heating carrier and said electron beam tip heating carrier; said base stage for coupling electrical current and high voltage to said electron beam sample heating carrier and said electron beam tip heating carrier; said electron beam heating device being used for heating the sample and the tip above 2300 K.

8. An electron beam heating device as recited in claim 1 wherein said electron beam sample heating carrier includes an electron shield connected to one of the contact bars for reflecting electrons from heating a bottom carrier plate.

9. An electron beam heating device as recited in claim 8 wherein said bottom carrier plate is formed of molybdenum.

10. An electron beam heating device as recited in claim 1 wherein said electron beam sample heating carrier includes an S-shaped filament.

11. An electron beam heating device as recited in claim 1 wherein said electron beam sample heating carrier includes a plurality of rods secured between a bottom carrier plate and a top plate, said contact bars being electrically isolated from said rods by ceramic bushings.

12. An electron beam heating device as recited in claim 10 wherein said electron beam sample heating carrier includes a sample support spring supporting the sample above said filament.

13. An electron beam heating device as recited in claim 12 wherein the sample is clamped between said sample support spring and said top plate.

14. An electron beam heating device as recited in claim 1 wherein said electron beam tip heating carrier includes a bottom carrier plate and a top plate fixed together with a plurality of bolts.

15. An electron beam heating device as recited in claim 14 wherein said filament of said electron beam tip heating carrier includes a double wire filament surrounding the tip on electron beam tip heating carrier.

16. An electron beam heating device as recited in claim 14 wherein said bottom carrier plate is formed of molybdenum; and wherein said top plate is formed of a ceramic material.

17. An electron beam heating device for a scanning tunneling microscope (STM), said electron beam heating device used for heating of a sample and a STM tip, said electron beam heating device comprising:
   an electron beam sample heating carrier;
   an electron beam tip heating carrier;
   said electron beam sample heating carrier and said electron beam tip heating carrier include a filament;

each said filament of said electron beam sample heating carrier and said electron beam tip heating carrier being mounted between a pair of contact bars; and contact bars being electrically isolated from said sample carrier and said tip carrier; and a base stage for mating engagement with one of said electron beam sample heating carrier and said electron beam tip heating carrier; said base stage for coupling electrical current and high voltage to said electron beam sample heating carrier and said electron beam tip heating carrier, and said base stage is formed of a machinable insulating ceramic.

* * * * *